United States Patent [19]

Lee

[11] Patent Number: 5,367,779

[45] Date of Patent: Nov. 29, 1994

[54] LASER MARKER

[75] Inventor: Roger Lee, Taipei, Taiwan, Prov. of China

[73] Assignee: Cheng Long Plastic Co., Ltd., Taipei, Taiwan, Prov. of China

[21] Appl. No.: 107,604

[22] Filed: Aug. 18, 1993

[51] Int. Cl.$^5$ .............................................. G01C 5/00
[52] U.S. Cl. ........................................ 33/290; 33/227; 33/DIG. 21
[58] Field of Search ................. 33/283, 285, 290, 292, 33/293, 294, 227, DIG. 21; 356/138, 249

[56] References Cited

U.S. PATENT DOCUMENTS

| | | | |
|---|---|---|---|
| 1,454,693 | 5/1923 | Schlattan | 33/290 |
| 3,897,637 | 8/1975 | Genho | 33/290 X |
| 3,909,952 | 10/1975 | Lagasse | 33/283 X |
| 4,752,126 | 6/1988 | Fujii | 33/285 X |
| 5,075,977 | 12/1991 | Rando | 356/138 X |

Primary Examiner—William A. Cuchlinski, Jr.
Assistant Examiner—Alvin Wirthlin
Attorney, Agent, or Firm—Jacobson, Price, Holman & Stern

[57] ABSTRACT

A laser marker which includes a casing having a battery chamber covered by a lid, a level bearing plate fastened to the casing at the bottom, a level mounted on the level bearing plate above the casing, adjustment rack pivotably fastened to the casing by two spring-supported locating plates and two axle caps to hold a light concentrator, a rotary socket covered by a lens cover to hold a lens in line with the light concentrator, whereby the adjustment rack is turned on the casing and retained in the desired angle by the locating plates, and the rotary socket is turned on the adjustment rack to let the light of the light concentrator be emitted through the lens and formed into a light spot or a line of light projected on an object.

6 Claims, 3 Drawing Sheets

LASER MARKER

BACKGROUND OF THE INVENTION

The present invention relates to a laser marker which comprises a level for adjusting the horizontal position of the laser marker, and adjustment rack pivotably fastened to a casing thereof for adjusting the vertical position of the light concentrator thereof, and rotary socket covered by a lens cover to hold a lens for regulating the light of the light concentrator into a light spot or a line of light for projection onto an object.

Conventionally, carpenters commonly use an ink box to mark lines of workpieces. When in use, the ink box is retained in position by one person, and the thread of the ink box is pulled by another person and then attached to the workpiece to mark a line thereon. This type of marking device is inconvenient in use, and it will contaminate the hands of the users and the workpieces easily.

SUMMARY OF THE INVENTION

The present invention has been accomplished to eliminate the aforesaid problems by providing a laser marker. According to one aspect of the present invention, the laser marker comprises a casing, a level bearing plate fastened to the casing at the bottom, a level mounted on the level bearing plate for adjusting the horizontal position of the laser marker, and an adjustment rack pivotably fastened to the casing. The adjustment rack comprises two axle bearings pivotably fastened to two opposite horizontal through holes on one end of the casing, a light concentrator in an internal space thereof, a rotary socket fastened in a recessed portion thereof in front of the light concentrator and covered by a lens cover to hold a lens. The laser marker is placed on a level adjustment device and adjusted to move the bubble of the level to the exact center of the glass tube thereof, then the adjustment rack is adjusted to the desired angle, and then the rotary socket is rotated to turn the light of the light concentrator into a vertical or horizontal line of light for projection onto an object.

According to another aspect of the present invention, the level bearing plate of the laser marker can be adhered to a bottom plate with an adjustment bar and then stably supported on a level adjustment device for allowing the laser marker to be adjusted to the horizontal.

According to still another aspect of the present invention, two locating plates are supported on two opposite sides of the two horizontal through holes of the casing by two springs to hold the axle bearings of the adjustment rack in position. Each locating plate comprises a center round hole for fastening either axle cap, a plurality of radial ribs on an outer side around the center round hole releasably engaged with respective radial grooves on either axle bearing of the adjustment rack.

According to still another aspect of the present invention, each axle cap comprises a head on one end, a tubular split flange on an opposite end releasably retained in either horizontal through hole on the casing, a plurality of longitudinal ribs spaced around a circle between the head and the tubular split flange and moved to push the respective loading plate away from the respective axle bearing for allowing the adjustment rack to be adjusted to the desired angle.

According to still another aspect of the present invention, the lens of the rotary socket comprises a diffusing lens for diffusion of the light concentrator into a line.

DETAILED DESCRIPTION OF THE PREFERRED EMBODIMENT

Referring to the annexed drawings in detail, a laser marker in accordance with the present invention is generally comprised of a level bearing plate 1, a casing 2, an adjustment rack 3, and axle caps 4.

Figure 1:
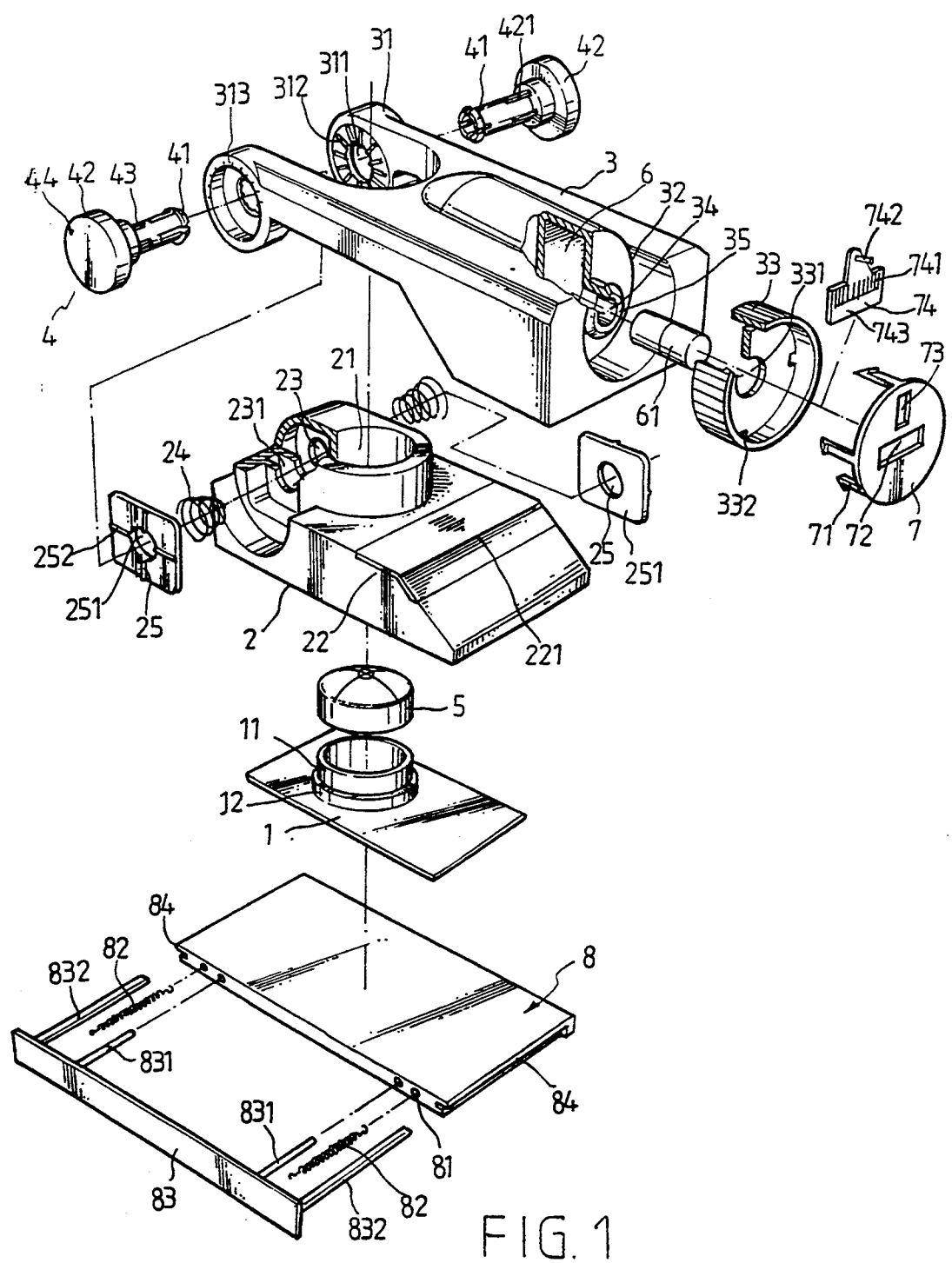
FIG. 1 is an exploded view of a laser marker according to the preferred embodiment of the present invention.

Referring to FIG. 1, the casing 2 is disposed above the level bearing plate 1. The level bearing plate 1 comprises a hollow bearing block 11 with an outside bottom flange 12 inserted into a vertical through hole 21 on the casing 2 to hold a level 5 above the casing 2. The casing 2 comprises a battery chamber 22 on the front end thereof covered by a battery lid 221, two horizontal through holes 23 bilaterally aligned on the rear end thereof, to which two opposite axle bearings 31 on one end of the adjustment rack 3 are fastened by two axle caps 4 for allowing the adjustment rack 3 to be pivoted to the casing 2. The adjustment rack 3 comprises an internal space 6, a rotary socket 33 received in a recessed portion 32 thereof in front of the internal space 6, a passage hole 34 disposed in the recessed portion 32 and communicated between the internal space 6 and the center through hole 331 on the rotary socket 33, a flange 35 surrounding the passage holes 34 on which the rotary socket 33 is mounted, a light concentrator 61 received in the internal space 6 and inserted with its one end into the passage holes 34 and the center through hold 331 of the rotary socket 33. As the rotary socket 33 is installed in the recessed portion 32, it can be rotated on the flange 35.

A bottom plate 8 is attached to the level bearing plate 1 at the bottom, having two pairs of side through holes 81 spaced on the same side and two end grooves 84 on two opposite ends thereof in parallel with the side through holes 81. An adjustment bar 83 is fastened to the bottom plate 8. The adjustment bar 83 comprises two sliding rods 832 perpendicularly disposed at two opposite ends thereof and respectively inserted into the end grooves 84 of the bottom plate 8, two spaced pins 831 respectively inserted into the respective one of either pair of side through holes 81. There are two springs 82, each having one end fastened in the other one of either pair of side through holes 81 on the bottom plate 8 and an opposite end fastened to the adjustment bar 83.

The casing 2 further comprises two recessed portions 231 bilaterally disposed on the outside of the horizontal through hoes 23, two springs 24 bilaterally disposed on the outside of the recessed portions 231, and two locating plates 25 bilaterally disposed on two opposite sides to hold the springs 24 in place. The locating plate 25 comprises a center round hole 251 for fastening the respective axle cap 4, and radial ribs 252 equiangularly spaced around the center round hole 251 on an outer side.

The axle bearing 31 comprises a center round hole 311 for fastening the respective axle cap 4, radial grooves 312 equiangularly spaced around the center round hole 311 on an inner side correspondent to the radial ribs 252 on the respective locating plate 25, and graduations 313 spaced around the center round hole 311 on an outer side correspondent to the radial grooves 312 for indicating different angles.

The axle cap 4 comprises a tubular split flange 41 inserted through the center round hole 311 on the respective axle bearing 31 and the center round hole 251 on the respective locating plate 25 and then retained in the respective horizontal through hole 23 of the casing 2, a plurality of longitudinal ribs 43 spaced around a circle between the head 42 thereof and the tubular split flange 41, and a mark of arrow 44 on the outside of the head 42. As the axle cap 4 is pressed against the respective axle bearing 31, the respective locating plate 25 is pushed by the longitudinal ribs 43 of the axle cap 4, causing the radial ribs 252 of the respective loading plate 25 to disengage from the radial grooves 312 on the respective axle bearing 31, and therefore the adjustment rack 3 can be turned on the axle caps 4 to change its angular position relative to the casing 2. As the angular position of the adjustment rack 3 is set, the springs 24 automatically push the locating plates 25 back to their former positions for allowing the respective radial ribs 252 to be engaged with the respective radial grooves 312. Thereof, the adjustment rack 3 is firmly retained to the casing 2 at the adjusted angle.

The rotary socket 33 comprises a plurality of mounting holes 332 spaced on the inside around the center through hole 331 for fastening a lens cover 7 to hold a lens 74. The lens cover 7 comprises a plurality of hooks 71 respectively hooked on the mounting holes 332 on the rotary socket 33, a rectangular projection hold 72 disposed in line with the light concentrator 61, and a locating hole 73 near the rectangular projection hold 72. The lens 74 is retained inside the rotary socket 33, comprising a diffusing lens 741 a general lens 743 and a hook 742 hooked on the locating hole 73 of the lens cover 7. By adjusting the hook 742, the diffusing lens 741 or the general lens 743 will be moved to the position in alignment with the projection hole 72 and the light concentrator 61, and therefore the light projected from the light concentrator 61 through the diffusing lens 741 or the general lens 743 will be formed into a line of light or a light spot onto an object.

Figure 2A:
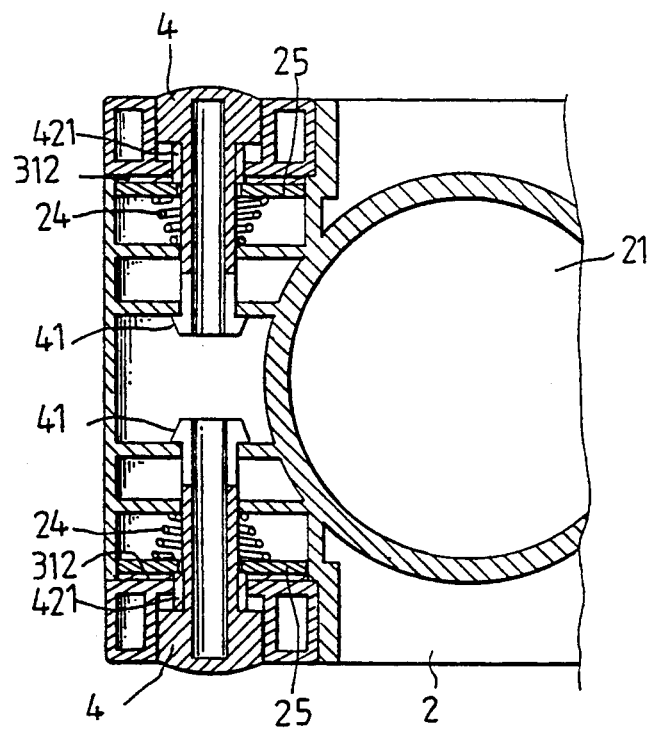
FIG. 2A is a partial sectional view in an enlarged scale showing locating plates respectively engaged with the axle bearings to hold the adjustment rack in position.
Figure 2B:
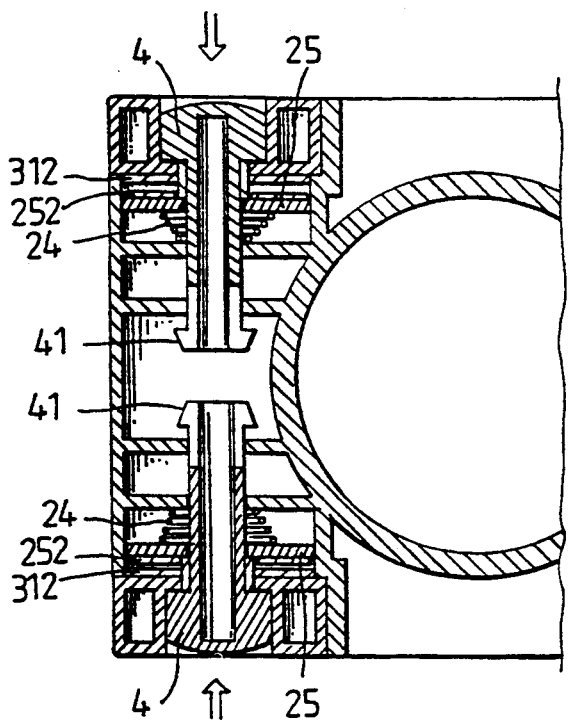
FIG. 2B is similar to FIG. 2A but showing the locating plates disengaged from the axle bearings for allowing the adjustment rack to be turned on the casing.

Referring to FIGS. 2A and 2B, as the adjustment rack 3 is lifted, the axle bearings 31 of the adjustment rack 3 are turned on the axle caps 4 and then retained in position as the radial ribs 252 of the locating plates 25 are respectively engaged with the radial grooves 312 of the axle bearings 31. When positioned, the contained angle between the adjustment rack 3 and the casing 2 is viewed through the mark of arrow 44 on the head 42 of either axle cap 4 and the graduations 313 on the respective axle bearing 313. To change the angular position of the adjustment rack 3 on the casing 2, the axle caps 4 are respectively pressed inwards to release the locating plates 25 from the axle bearings 31 for allowing the adjustment rack 3 to be turned to the desire angle. When adjusted, the axle caps 4 are released, and the locating plates 25 are pushed by the springs 24 to engage with the axle bearings 31 again, and therefore the adjustment rack 3 is retained in the adjusted position.

Figure 3:
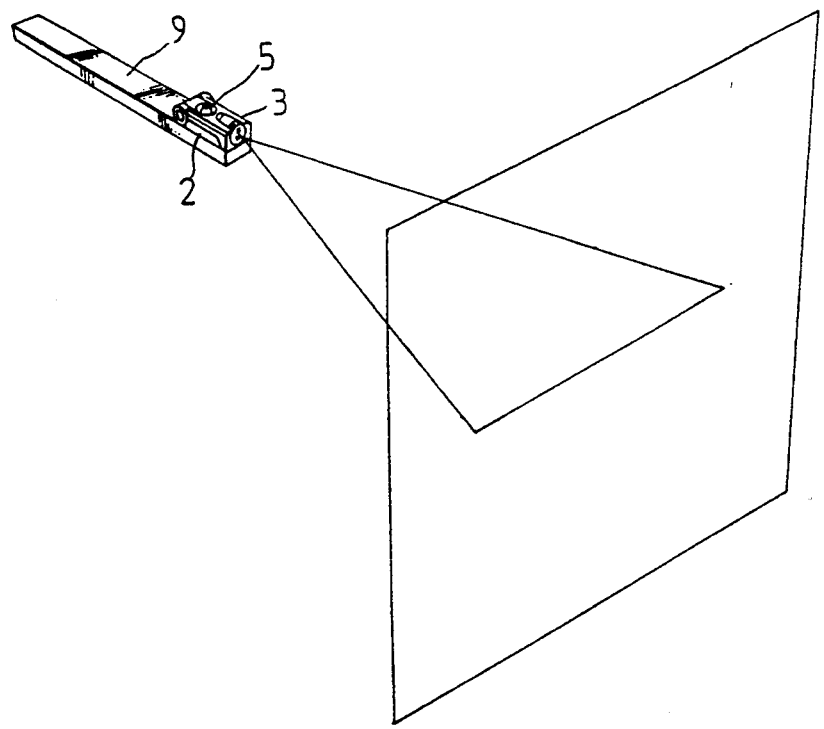
FIG. 3 is an applied view showing the laser marker operated to mark a horizontal line of light on a board.
Figure 4:
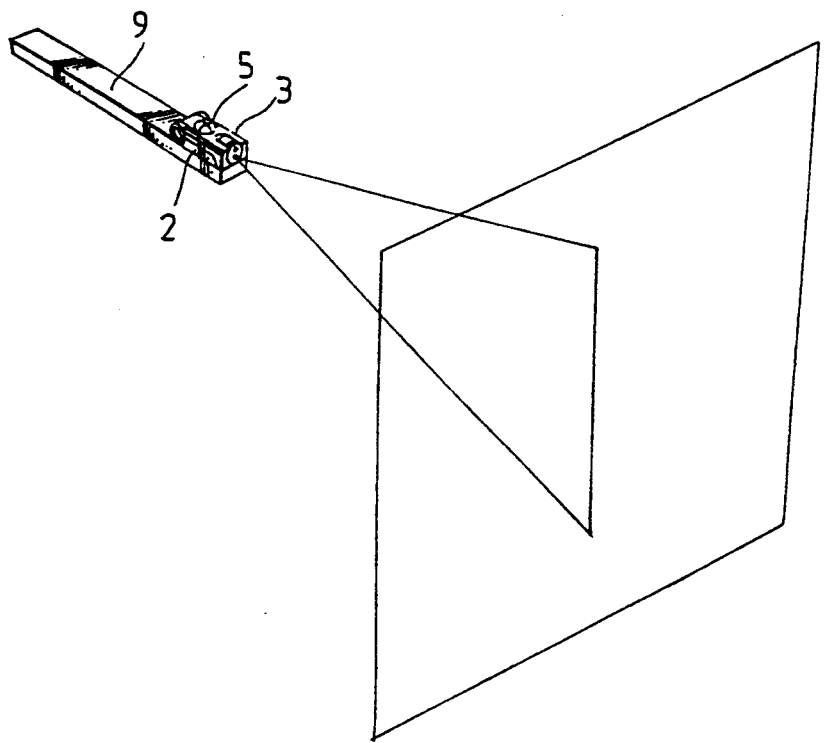
FIG. 4 illustrates the laser marker operated to mark a vertical line of light on the board.

Referring to FIGS. 3 and 4, the level bearing plate 1 of the laser marker is adhered to the bottom plate 8, and then the bottom plate 8 is placed on a level adjustment device 9 and adjusted to the desired position by means of adjustment the adjustment bar 83. Then, the air bubble of the level 5 is moved to the exact center of the glass tube thereof by means of adjustment the level adjustment device 9. As the air bubble of the level 5 is moved to the exact center of the glass tube thereof, the laser marker is disposed in an even horizontal plane, and then the adjustment rack 3 is adjusted to the desired angle. By turning the rotary socket 33 on the adjustment rack 3 around the light concentrator 61, the light projected from the light concentrator 61 through the diffusing lens 741 or the general lens 743 and the rectangular projection hole 72 on the lens cover 7 is formed into a line of light or a light spot projected onto a board.

I claim:

1. A laser marker comprising a casing, a level bearing plate fastened to said casing at the bottom of said casing, a level mounted on said level bearing plate, and an adjustment rack pivotably fastened to said casing, said level bearing plate comprising a hollow bearing block inserted into a vertical through hole on said casing to hold said level about said casing, said casing comprising a front battery chamber covered by a battery lid, two horizontal through holes bilaterally aligned on a rear end of said casing, said adjustment rack comprising two axle bearings pivotably fastened to the two horizontal through holes of said casing by two axle caps, an internal space in said adjustment rack, a light concentrator located in said internal space, a tubular flange located in a recessed portion of said adjustment rack in front of said internal space and a rotary socket revolvably mounted on said tubular flange, said rotary socket comprising a center through hole aligned with said light concentrator.

2. The laser marker of claim 1 wherein said level bearing plate is adhered to a bottom plate supported on a level adjustment device and adjusted to the horizontal by an adjustment bar, said bottom plate comprising a first pair of side through holes, a second pair of side through holes, two end grooves, a pair of springs respectively received in said first pair of side through holes and connected to said adjustment bar, said adjustment bar comprising two sliding rods perpendicularly disposed on two opposite ends thereof and respectively inserted into said end grooves, and two pins on said adjustment bar disposed in parallel with said sliding rods and respectively inserted into said second pair of side through holes.

3. The laser marker of claim 1 wherein said casing further comprises two recessed portions bilaterally disposed on the outside of the horizontal through holes thereof, two locating plates bilaterally disposed on two opposite sides relative to the recessed portions of said casing, two springs respectively retained between the recessed portions of said casing and said locating plates, each locating plate comprising a center round hole for fastening either axle cap and radial ribs equiangularly spaced around the center round hole thereof on an outer side.

4. The laser marker of claim 1 wherein each axle bearing of said adjustment rack comprises a center round hole for fastening either axle cap, a plurality of radial groves around the center round hole on an inner side, and graduations around the center round hole on an outer side correspondent to the radial grooves for the indication of different angles.

5. The laser marker of claim 1 wherein each axle cap comprises a head on one end, a tubular split flange on an opposite end releasably retained in either horizontal through hole on said casing, a plurality of longitudinal ribs spaced around a circle between said head and said tubular split flange, said head being marked with an arrow.

6. The laser marker of claim 1 wherein said rotary socket is covered with a lens cover to hold a lens there between, said rotary socket comprising a plurality of mounting holes located around the center through hole thereof, said lens cover comprising a plurality of hooks respectively received in said mounting holes of said rotary socket, a rectangular projection hole located in the center of said lens cover in line with said light concentrator, and a locating hole located able said rectangular projection hole, said lens comprising a diffusing lens surface, a general lens and a hook projecting from said lens into the locating hole on said lens cover.

* * * * *